(12) United States Patent
Kenmochi et al.

(10) Patent No.: US 6,554,937 B1
(45) Date of Patent: Apr. 29, 2003

(54) PROCESS FOR MAKING DISPOSABLE WIPE-OUT SHEET

(75) Inventors: Yasuhiko Kenmochi, Kagawa (JP); Yoshinori Tanaka, Kagawa (JP)

(73) Assignee: Uni-Charm Co., Ltd., Ehime (JP)

( * ) Notice: Subject to any disclaimer, the term of this patent is extended or adjusted under 35 U.S.C. 154(b) by 0 days.

(21) Appl. No.: 09/958,850

(22) Filed: Oct. 11, 2001

(30) Foreign Application Priority Data

Apr. 13, 1999 (JP) .............................. 11-105945

(51) Int. Cl.[7] .......................... A47L 13/16; B32B 31/08; B32B 31/18
(52) U.S. Cl. ..................... 156/178; 156/209; 156/290; 156/308.4; 15/209.1; 15/226; 15/229.1
(58) Field of Search ................. 156/62.2, 73.2, 156/73.4, 178, 209, 290, 308.4; 15/209.1, 226, 229.1, 229.6

(56) References Cited

U.S. PATENT DOCUMENTS 6,245,413 B1 * 6/2001 Kenmochi et al. .......... 428/157

FOREIGN PATENT DOCUMENTS

| EP | 0 774 229 A2 | 5/1997 |
| JP | 9-135798 | 5/1997 |

* cited by examiner

*Primary Examiner*—Sam Chuan Yao
(74) *Attorney, Agent, or Firm*—Butzel Long

(57) ABSTRACT

A process for making wipe-out sheet that includes the steps include placing a deregistered tow upon a web of a base sheet, covering transversely opposite side edge regions of the deregistered tow and transversely opposite side edge regions of the base sheet with ribbon-like sheets and heat-sealing the ribbon-like sheets with the base sheet along the side edge regions of the base sheet.

1 Claim, 3 Drawing Sheets ically used;

PROCESS FOR MAKING DISPOSABLE WIPE-OUT SHEET

TECHNICAL FIELD OF THE INVENTION

This invention relates to a disposable wipe-out sheet suitable for wiping out dust and/or dirt from floor or wall surfaces.

RELATED ART

Japanese Patent Application Publication No. 1997-135798A describes a disposable wipe-out sheet comprising a heat-sealable synthetic resin base sheet and a plurality of heat-sealable synthetic resin filaments bonded to this sheet and extending in one direction. These filaments are obtained by deregistering or opening a tow of continuous filaments and bonded to the base sheet by a plurality of sealing lines extending transversely of the filaments and arranged intermittently in the one direction. The tow having been deregistered and spred transversely of the base sheet and bonded along transversely opposite side edge regions to the base sheet at sealing spots. The base side edge regions of the base sheet are folded back and heat-sealed together, respectively, to reinforce these side edge regions.

For continuous production of the well known wipe-out sheets at a predetermined high velocity, a heated block or supersonic horn extending transversely of a laminate comprising a continuous web of the base and deregistered tow is instantaneously pressed against the lamination to form the lamination with the sealing lines. However, in the case of the wipe-out sheet of prior art, there is a concern that the deregistered tow might spread excessively or insufficiently or even meander off from a predetermined straight course under a pressure of the heated block or supersonic horn. These phenomena would deteriorate the quality of the wipe-out sheet and/or decrease its yield rate.

This invention aims to prevent a tow from excessively spreading in the course of the process for making a disposable wipe-out sheet.

DISCLOSURE OF THE INVENTION

According to this invention, there is provided a process for making a disposable wipe-out sheet comprising a heat-sealable synthetic resin base sheet and a plurality of heat-sealable synthetic resin long fibers extending in one direction of the base sheet, and the fibers being bonded to the base sheet by a plurality of sealing lines extending transversely of the one direction and arranged intermittently in said one direction.

In such a process, this invention comprises the steps of:
a. feeding a continuous base sheet intended to become the base sheet and a tow of continuous filaments intended to become the long fibers in said one direction;
b. deregistering the tow to spread in a range narrower than a width and placing this upon the base sheet leaving transversely opposite marginal side edge regions of the base exposed as the deregistering tow is fed;
c. continuously feeding a pair of heat-sealable synthetic resin narrow sheets each in the form of ribbon along the marginal side edge regions of the base sheet to cover the marginal side edge regions of the base sheet and transversely opposite side edge regions of the deregistered tow; and
d. forming the deregistered tow and the base sheet with a plurality of sealing lines extending transversely of the one direction and arranged intermittently in the one direction and then heat-sealing the narrow sheets each in the form of ribbon with the base sheet along the side edge regions thereof as or immediately before the deregistered tow is bonded to the base sheet.

According to one preferred embodiment of this invention, the sealing lines extend transversely of the one direction so that the narrow sheets each in the form of ribbon can be heat-sealed with said fibrillated tow along its transversely opposite side edge regions thereof.

DESCRIPTION OF THE PREFERRED EMBODIMENTS

Details of a disposable wipe-out sheet according to this invention will be more fully understood from the description given hereunder with reference to the accompanying drawings.

Figure 1:
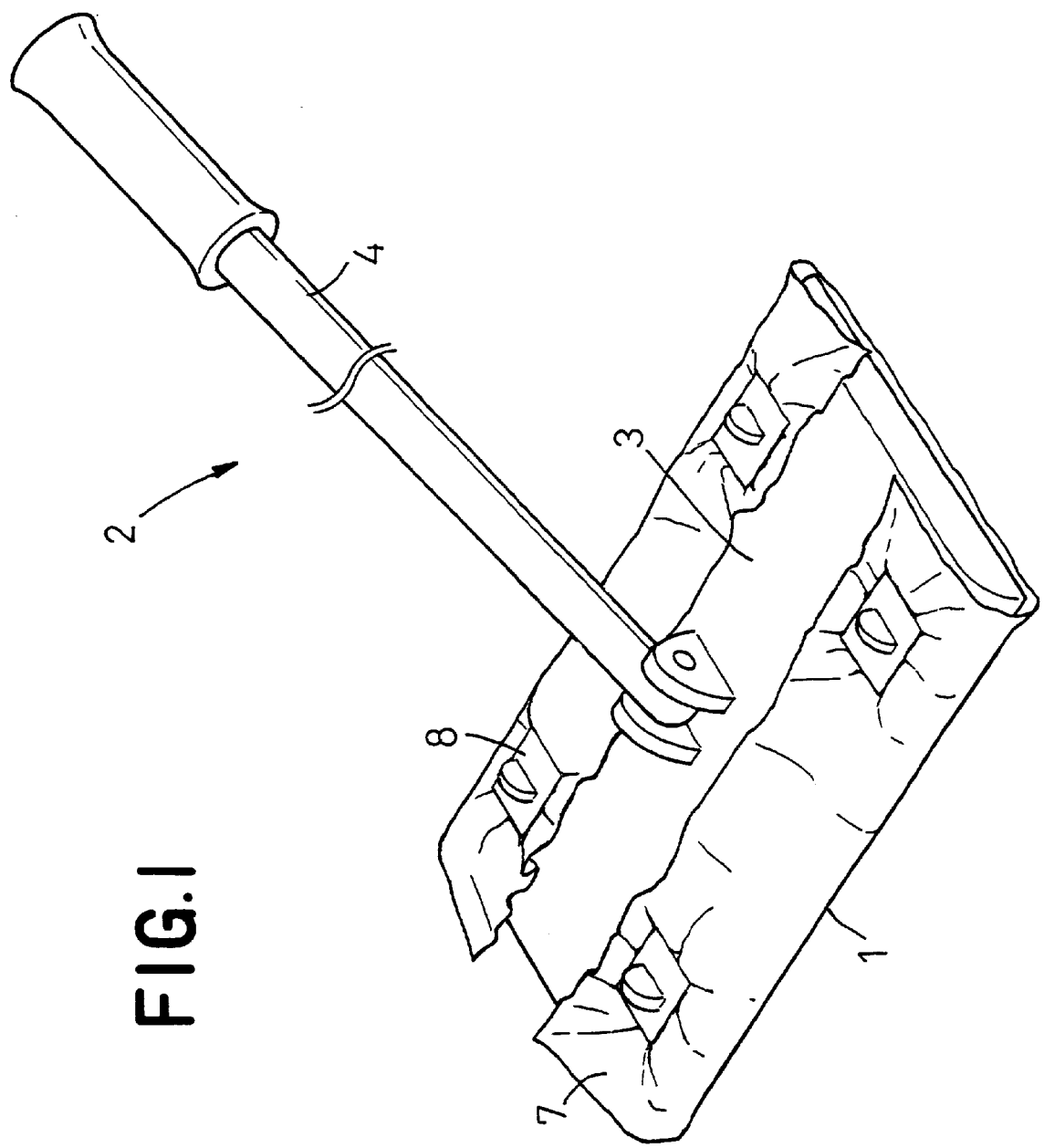
FIG. 1 is a perspective view showing a wipe-out sheet according to this invention as being actually used.

FIG. 1 is a perspective view showing a holder 2 with a disposable wipe-out sheet 1 attached thereto. The holder 2 comprises a base plate 3 and a stick 4. The wipe-out sheet 1 placed against the lower surface of the base plate 3 has its opposite long side edge regions 7 folded back onto the upper surface of the base plate 3 and fastened to the upper surface by means of clips 8 mounted on the base plate 3. Dust and/or dirt on floor or wall surfaces may be wiped out by the wipe-out sheet 1 attached to the holder 2 with the stick 4 gripped in a user's hands.

Figure 2:
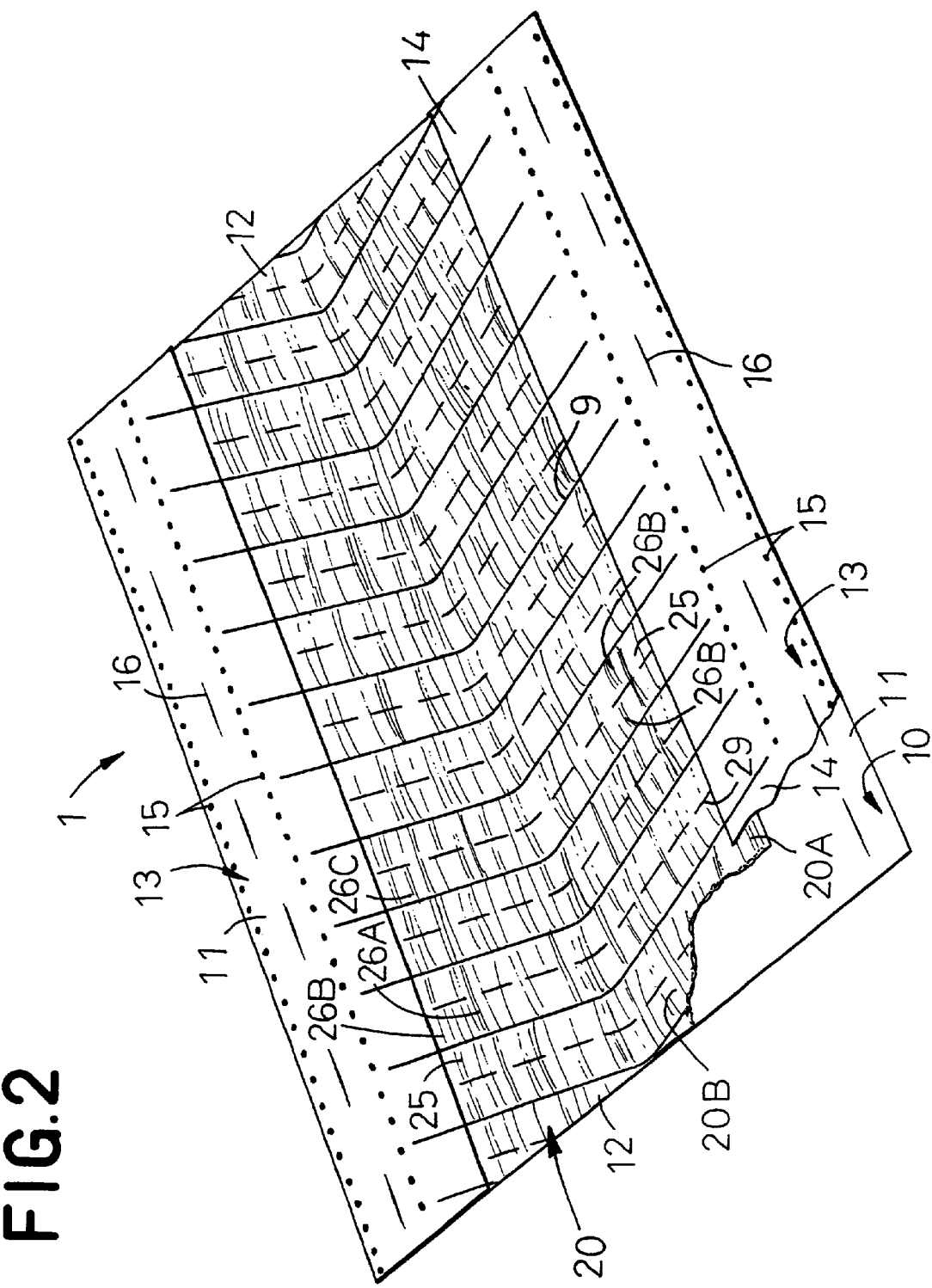
FIG. 2 is a perspective view showing the wipe-out sheet detached from its holder and developed as partially broken away.

FIG. 2 is a partially cutaway perspective view showing the same wipe-out sheet 1 as the wipe-out sheet 1 shown by FIG. 1. The wipe-out sheet 1 is herein illustrated as have been detached from the base plate 3 and developed with its wiper surface facing upward. The wipe-out sheet 1 comprises a base sheet layer 10 made of a heat-sealable synthetic resin film or nonwoven fabric and a wiper layer 20 formed by a plurality of heat-sealable long fibers or filaments 25 bonded to the upper surface of the base sheet layer 10.

The base sheet layer 10 is of a rectangular shape defined by a pair of opposite long side edge regions 11 extending parallel to each other and a pair of opposite short side edges 12 extending also parallel to each other. Ribbon-like reinforcing sheets 13 made of a synthetic resin film are heat-sealed with the opposite side edge regions 11 at a plurality of spots 15 in order to improve a tear strength of these side edge regions 11. Referring to FIG. 2, a pair of opposite side edge regions 20A of the wiper layer 20 are covered with inner edge regions 14 of the respective ribbon-like reinforcing sheets 13. The side edge regions 11 of the base sheet layer 10 are formed with a plurality of slits 16 extending through these side edge regions 11 as well as the respective ribbon-like reinforcing sheets 13. These slits 16 facilitate the wipe-out sheet 1 to be attached to the holder 2 by means of the clips 8.

The wiper layer 20 comprises a plurality of long fibers 25, i.e., continuous filaments extending substantially parallel to the side edge regions 11 of the base sheet layer 10. These long fibers 25 are heat-sealed with the base sheet layer 10 along a plurality of sealing lines 9 intermittently arranged to extend between the pair of opposite side edge regions 11 substantially parallel to each other toward the direction of the opposite short side edge regions 12 of the base sheet layer 10. The respective long fibers 25 partially define relatively long bridge-like portions 26A connecting each pair of the adjacent sealing lines 9 and relatively short fluffy portions 26B formed by severing the remaining long fibers 25 along sliting line 29 between each pair of the adjacent sealing lines 9. The fluffy portions 26B have their respective one ends bonded to the base sheet 10 by the sealing lines 9 and their respective other ends freely movable into spaces or gaps possibly present on a floor or wall surface to catch dust and/or dirt possibly present therein.

The sealing lines 9 are formed by heating the base sheet layer 10 together with an assembly of the long fibers 25 under a pressure exerted to them so that they are pressed against each other in the direction of thickness. The assembly of the long fibers 25 is bulky and the finished wipe-out sheet 1 is formed with a plurality of troughs 26C in the vicinity of the sealing lines 9 compressed at a high density as a result of the heating under a pressure. Lengths of the long fibers 25 continuously extending between each pair of the adjacent sealing lines 9 form the convex bridge-like portions 26A describing arcs which are convex upwardly of the base sheet layer 10. The lengths of the long fibers 25 extending each pair of the adjacent sealing lines 9 are partially severed in two, respectively, to form the fluffy portions 26B.

Figure 3:
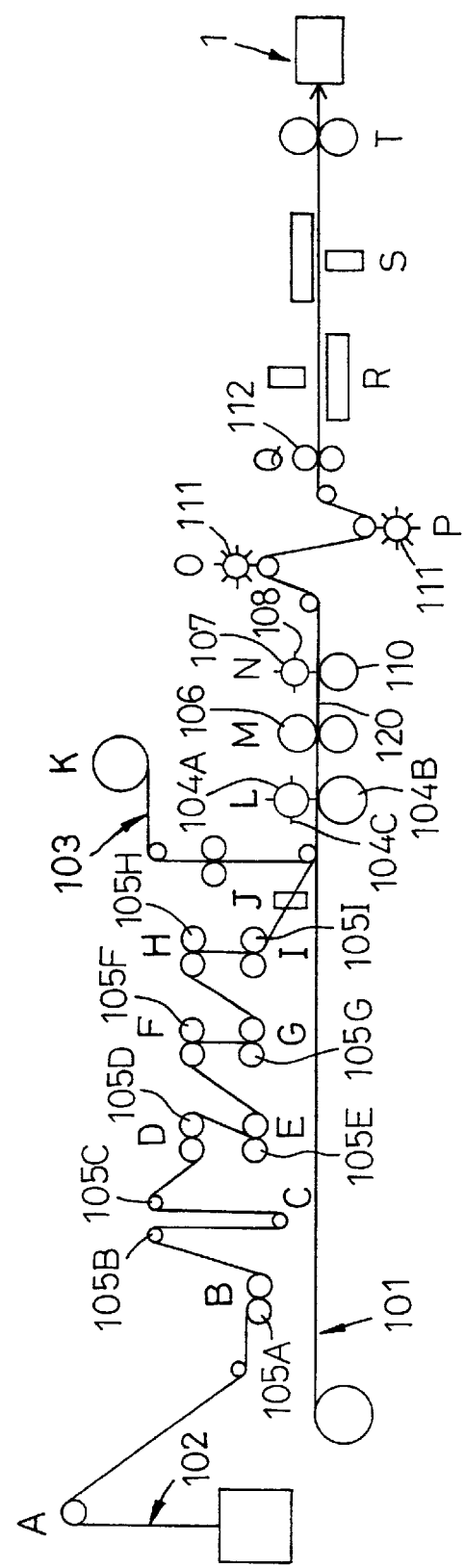
FIG. 3 is a diagram illustrating a process for making the wipe-out sheet.

FIG. 3 is a diagram illustrating a process for making the wipe-out sheet. From the left hand as viewed in this diagram, a continuous base sheet 101 intended to become the base sheets 10 and a tow 102 of continuous filaments intended to become the long fibers 25 are continuously fed. The tow 102 is a bundle of crimped conjugated fibers. The tow 102 is introduced to a step A and then subjected successively to the following steps.

Steps B~D: Revolution speeds of respective rolls 105A~105D are progressively reduced to tension the tow 102 and thereby to deregistered or open the tow 102. The tension of the tow 102 is controlled by the rolls 105B~105C.

Steps E~J: Revolution speeds of respective rolls 105E~105I are progressively reduced to restore crimps of the tow 102 to adjust an entire width of the deregistered tow 102 to a predetermined width smaller than a width of the base sheet 101.

Step K: After the deregistered tow 102 has been placed on a transversely middle zone of the base sheet 101, a pair of ribbon-like sheets each in the form of continuous ribbon-like sheets 103 are fed so that the transversely opposite side edge regions of the base sheet 101 and the transversely opposite side edge regions of the deregistered tow 102 having its width having been adjusted to the predetermined width may be covered with the ribbon-like sheets 103, respectively.

Step L: The base sheet 101, the deregistered tow 102 and the ribbon-like sheets 103 are locally pressed together under heating between a lower roll 104B and an upper roll 104A provided with heated blades 104 to form the sealing lines 9 extending transversely of the base sheet 101 and arranged intermittently in the machine direction along which these components 101, 102, 103 are heat-sealed together.

Step M: A pair of heat-embossing rolls 106 are used to heat-seal the ribbon-like sheets 103 with the base sheet 101 and thereby to obtain a laminate 120 consisting of the base sheet 101, the deregistered tow 102 and the ribbon-like sheets 103.

Step N: Cutter blades 108 of an upper roll 107 are successively pressed against a lower roll 110 to locally sever the laminate 120 between these rolls 107, 110 and thereby to form severed zones 29 of the wipe-out sheet 1.

Steps O~P: The tow 10 deregistered and severed is fluffed by a rotary brush 111. If desired, the lower surface of the base sheet 101 is also treated by the rotary brush 111 on the step P. It should be understood that an air stream supplied from a blower may be used instead of or with the rotary brush 111 to fluff the severed tow 101.

Step Q: Marginal edges of the base sheet 101 and/or the ribbon-like sheets 103 are cut off by a slitter 112 in the form of paired rolls and thereby a width of the laminate 120 is adjusted to a width of the wipe-out sheet 1. At the same time, the transversely opposite side edge regions of the base sheet 101 are formed with the slits 16 of the wipe-out sheet 1.

Steps R~S: The deregistered tow 102 and, if desired, the base sheet 101 are applied on their lower surfaces with surfactant for capture of dust and/or dirt.

Step T: The laminate 120 is cut into a suitable length to obtain the individual wipe-out sheets 1.

It is also possible to provide, of these steps A~T, the step L and the step M in the reverse order so that the base sheet 101 and the deregistered tow 102 may be formed with the sealing lines 9 after the ribbon-like sheets 103 have been heat-sealed with the base sheet 101.

In general, it is concerned for the conventional process for making the wipe-out sheet that the bulky crimped tow 102 might be excessively spread by the heated blade 104C transversely of the base sheet 101 as the heated blade 104C extending transversely of the base sheet 101 is pressed against the deregistered tow 102 in order to heat-seal the deregistered tow 102 with the base sheet 101. Consequently, many wipe-out sheets 1 obtained by such a process might have the transversely opposite side edges of the deregistered tow 102 lack of a positional uniformity. This will lower a value of the wipe-out sheet as a commercial article and, in addition, complicate the operation of clipping the wipe-out sheet 1 to the holder 2. According to the process according to this invention, the deregistered tow 102 is heat-sealed with the base sheet 101 after the respective side edge regions of the base sheet 101 and the deregistered tow 102 have been covered with the ribbon-like sheets 103. In this manner, even if the deregistered tow 102 has its transversely opposite side edges which are lack of positional uniformity depending on the individual wipe-out sheets 1, this is not so remarkable to reduce the value of the wipe-out sheet 1 as the commercial article.

When, of the steps A~T, the step L and the step M are provided in reverse order so that the deregistered tow 102 is heat-sealed with the base sheet 101 after the outer side edge regions of the ribbon-like sheets 103 are heat-sealed with the base sheet 101 and said side edge regions are covered with the inner side edge regions of the ribbon-like sheets 101, the deregistered tow 102 tending to excessively spread is held between the ribbon-like sheets 103 and the base sheet 101. In this manner, the deregistered tow 102 is prevented from further spreading transversely beyond the regions to be heat-sealed with the base sheet 101 and the width of the deregistered tow 102 is easily controlled.

The base sheet 101, the tow 102 and the ribbon-like sheets 103 employed in the process as has been described above correspond to the base sheet layer 10, the long fibers 25 and the reinforcing 13 in the finished wipe-out sheet 1.

The process for making wipe-out sheet according to this invention is characterized in that the respective side edge regions of the base sheet and the bundle of long fibers are covered with the ribbon-like sheets as or immediately before the base sheet is bonded to the bundle of the long fibers placed upon the base sheet. Such unique order of the steps is effective to avoid a positional unevenness, if any, occurring in the side edges of the bundle of the long fibers relative to the side edges of the base sheet which might be noticeable for a user's eyes. Particularly when the long fibers are heat-sealed with the base sheet after the ribbon-like sheets have been heat-sealed with the base sheet along the side edge regions of said base sheet, the bundle of long fibers are prevented from spreading beyond the regions in which the ribbon-like sheets have been heat-sealed with the base sheet.

What is claimed is:

1. A process for making a disposable wipe-out sheet comprising a heat-sealable synthetic resin base sheet and a plurality of heat-sealable synthetic resin fibers extending in a first direction of said base sheet, and said fibers being bonded to said base sheet by a plurality of sealing lines extending transversely of said one direction and arranged intermittently in said first direction, said process comprising the steps of:

a. feeding a continuous heat-sealable synthetic base sheet and a tow of continuous filaments in a first direction;

b. deregistering said tow to form a plurality of fibers that are spread out in a dimension that is narrower than a width of said base sheet and placing the spread out plurality of fibers upon said base sheet so as to leave transversely opposite marginal side edge regions of said base sheet exposed as said deregistering tow is fed;

c. continuously feeding a pair of heat-sealable synthetic resin narrow sheets each in the form of ribbon along said marginal side edge regions of said base sheet to cover said marginal side edge regions of said base sheet and transversely opposite side edge regions of said deregistered tow, each of said heat-sealable synthetic resin narrow sheets having opposed inner and outer side edges;

d. heat-sealing said outer side edges of said heat-sealable synthetic resin narrow sheets with said base sheet along said marginal side edge regions of the base sheet; and e. bonding said deregistered tow to said base sheet with a plurality of sealing lines extending transversely of said first direction and arranged intermittently in said first direction, said plurality of sealing lines extending onto said inner side edges of said heat-sealable synthetic resin narrow sheets.

* * * * *